United States Patent
Wiener et al.

(10) Patent No.: US 9,609,272 B2
(45) Date of Patent: Mar. 28, 2017

(54) OPTIMIZED VIDEO SNAPSHOT

(71) Applicant: AVAYA, INC., Basking Ridge, NJ (US)

(72) Inventors: Yair Wiener, Qiryat Ono (IL); Ori Modai, Ramat-Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 125 days.

(21) Appl. No.: 13/875,390

(22) Filed: May 2, 2013

(65) Prior Publication Data

US 2014/0327730 A1 Nov. 6, 2014

(51) Int. Cl.
*H04N 7/15* (2006.01)
*G10L 25/57* (2013.01)

(52) U.S. Cl.
CPC .............. *H04N 7/15* (2013.01); *G10L 25/57* (2013.01)

(58) Field of Classification Search
USPC ...................................................... 348/14.07
See application file for complete search history.

(56) References Cited

U.S. PATENT DOCUMENTS

| 5,878,396 | A * | 3/1999 | Henton | ................... G10L 15/24 |
| | | | | 375/E7.083 |
| 6,964,023 | B2 * | 11/2005 | Maes et al. | .................... 715/811 |
| 8,212,856 | B2 | 7/2012 | Modai et al. | |
| 2006/0248210 | A1 * | 11/2006 | Kenoyer | .......... H04L 29/06027 |
| | | | | 709/231 |
| 2014/0258393 | A1 * | 9/2014 | Bank | ..................... H04L 65/403 |
| | | | | 709/204 |

FOREIGN PATENT DOCUMENTS

CN    1527602 A    9/2004

OTHER PUBLICATIONS

Tabitha Strickland; Phonology; http://www.uncp.edu/home/canada/work/caneng/phono.htm ; Apr. 10, 2013; pp. 1-7.
Karis Productions; The Amazing Power of Phonemes; http://www.karisproductions.com/blog/ ; pp. 1-3.

* cited by examiner

*Primary Examiner* — Amal Zenati

(57) ABSTRACT

Methods, media and devices for generating an optimized image snapshot from a captured sequence of persons participating in a meeting are provided. In some embodiments, methods media and devices for utilizing a captured image as a representative image of a person as a replacement of a video stream; as a representation of a person in offline archiving systems; or as a representation of a person in a system participant roster.

16 Claims, 2 Drawing Sheets

OPTIMIZED VIDEO SNAPSHOT

FIELD OF THE INVENTION

The field of the invention relates generally to methods, media, and devices for providing visual resources of video conference participants.

BACKGROUND OF THE INVENTION

Video conferencing systems are in wide-spread use and enable participants who may be in vastly different geographical locations to have face-to-face meetings without the need to travel great distances. When participating in such conferences, it may be useful to view the video of the participants throughout the conference, and to be able to determine who is on the conference at any time during the conference.

SUMMARY OF THE INVENTION

An embodiment of the invention may therefore comprise a method for presenting an aesthetic image, the method comprising analyzing an audio track of a user in a conference to determine when the user is an active speaker, when the user is an active speaker, analyzing a speech signal of the audio track to identify aesthetic phonemes for when the user is an active speaker, and determining at least one image of the user corresponding to the aesthetic phonemes.

An embodiment of the invention may further comprise A system for presenting an aesthetic image, the system comprising an audio analysis tool enabled to analyze an audio track of a conference to determine when a participant to a conference is an active speaker, analyze a speech signal of the audio track to identify aesthetic phonemes of the active speaker, and determine at least one image of the active speaker corresponding to the aesthetic phonemes.

DETAILED DESCRIPTION OF THE EMBODIMENTS

Figure 1:
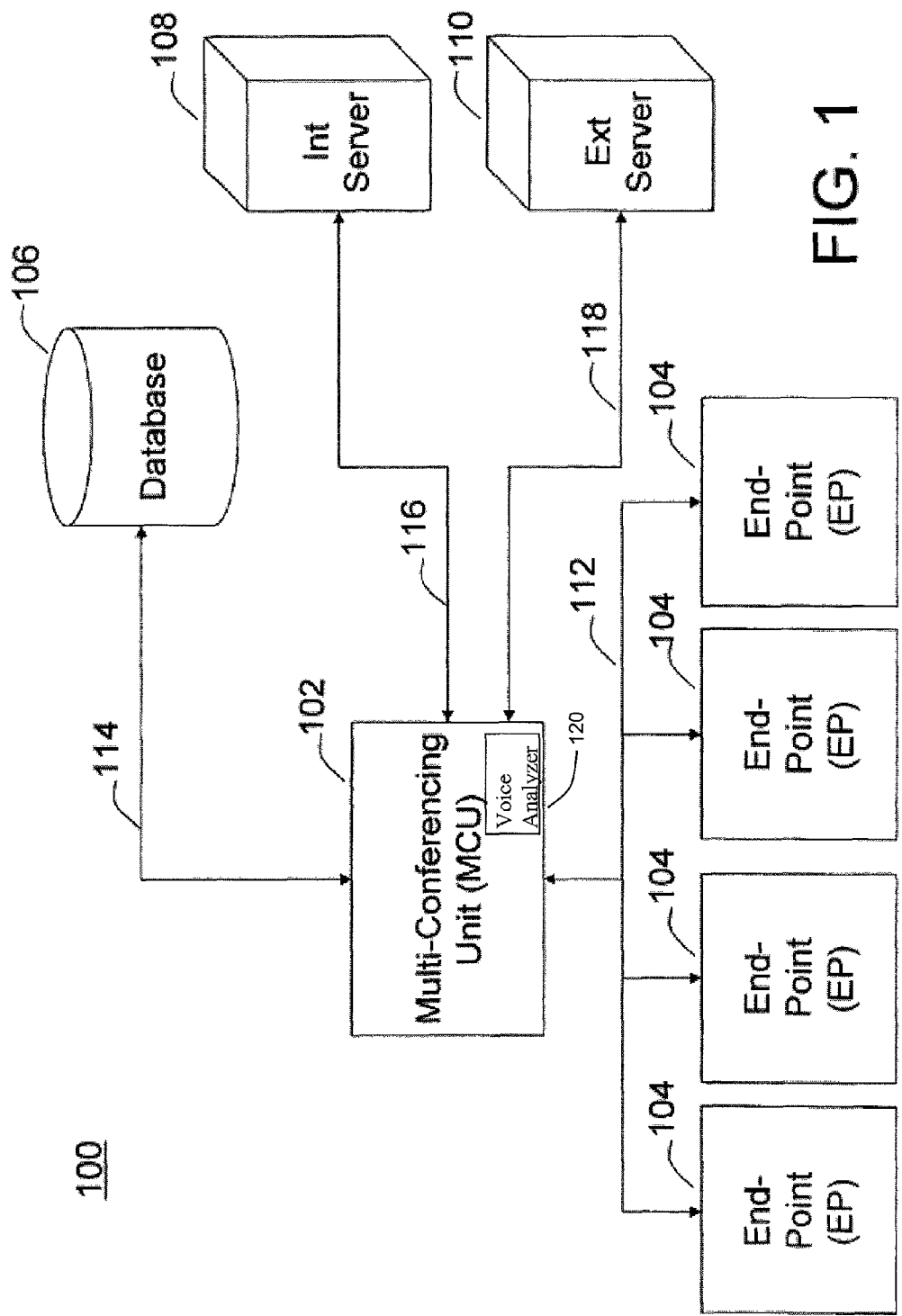
FIG. 1 shows a system for providing visual resources of video conference participants.

Methods, media, and devices for providing visual resources of video conference participants are provided. An optimized image snapshot from a captured sequence of persons participating in a conference may be generated. It is understood that an optimized image may be a video frame in which a captured object, such as a person or persons, is fully visible in the frame. A fully visible capture may be one in which there is no cut out, or that is not occluded. The person of interest so understood that the perfect capture may not be attainable but that more preferred captures may be obtained.

High efficiency, low complexity audio analysis tools may be utilized to capture an audio track. The extraction of an image from a video sequence of a person may be target based on when it is known that the person is speaking. The propensity for an active speaker, who is engaged in the conference and aware that attention is focused on them, may be to attempt to optimize their appearance by looking at the camera and positioning themselves in front of the camera so as to not be obscured, is leveraged by the current invention.

Phonemes can also be analyzed to obtain a preferable capture. The audio track can be utilized in order to identify aesthetic facial expressions. The system of the invention may identify phonemes where the person actively speaking has lips and face positioned in an aesthetic manner. It is understood that a phoneme analysis may be less computationally complex than image analytics methodologies.

A captured image may be associated with a particular participant for which it was taken. There are many uses for which a captured image may be employed. A captured image may act as a representative image of a conference participant in replacement of a video stream. This may be such were the participant has muted his video or network conditions do not, at a particular time, provide optimal video quality. A captured image may act as a representative image of a conference participant in offline archiving systems. The captured image may identify a speaker in for those segments of the archived conference when that participant was actively speaking. A captured image may act as a representation of a conference participant in a system participant roster. A captured image may act as a visual queue for different events which may occur during a conference. Examples of these events are when a participant begins presenting, or when a participant sends a chat message, or "raises their hand", etc. It is understood that the above are examples of uses of captured images and those skilled in the art may use such captured images in many other circumstance.

A system of the invention is enabled to receive a set of synchronized audio and video streams. The system will extract aesthetic video snapshots, or images, of participants to a conference. The audio and video streams of a particular user may be time-stamped by the system, such as by a set of synchronized capture clocks.

The system analyzes the audio track of a participant to the conference. When the participant is an active speaker, the system will analyze the speech signal and segment the audio by phonemes. It is understood that such an analysis can be performed by a VAD (Voice Activity Detection) algorithm.

In an embodiment of the invention, the system may classify the phonemes into a number of different sets. A first set may be phonemes that are associated with aesthetically pleasing face expressions. These phonemes are generally referred to as "aesthetic phonemes". Other phonemes may be categorized into one or more other sets. When analyzing phonemes, the system may select periods just before or after the phoneme, such as a period of silence. When analyzing phonemes, the system may classify by a sub component of a particular phoneme. This may be such as a consonant or a vowel. The system may classify by a set or sequence of phonemes. The system may further refine an image selection by alternative audio parameters. These alternative audio parameters may be, for example, an estimation of the audio direction which may be indicated by the use of multiple microphones. The audio level, background noise estimation, cross talk detection, or other audio parameters, may be used for refinement.

FIG. 1 shows a system for providing visual resources of video conference participants. The system 100 may comprise a multi-conferencing unit (MCU) 102, end points 104, a database 106, an internal server 108, an external server 110, and connections 112, 114, 116, and 118. The MCU 102 may comprise a voice analysis tool 120. The voice analysis tool may be a VAD, as discussed, or other voice analysis tool, as is understood by those skilled in the art. While the voice analysis tool 120 is shown in the MCU 102, it is understood that the voice analysis tool may be elsewhere in the system 100. For instance, the voice analysis tool, and an algorithm of the invention, may be particularly suited to perform its functions at an end point or communication client of the user. The voice analysis tool 120 is shown in FIG. 1 in the MCU for convenience purposes only and it is not intended to be restricted in where the algorithm may be performed. Further, it is understood that the algorithm, or voice analysis tool, may analyze a recorded sequence, which is part of a conference, to extract a representative image of a speaker.

Figure 2:
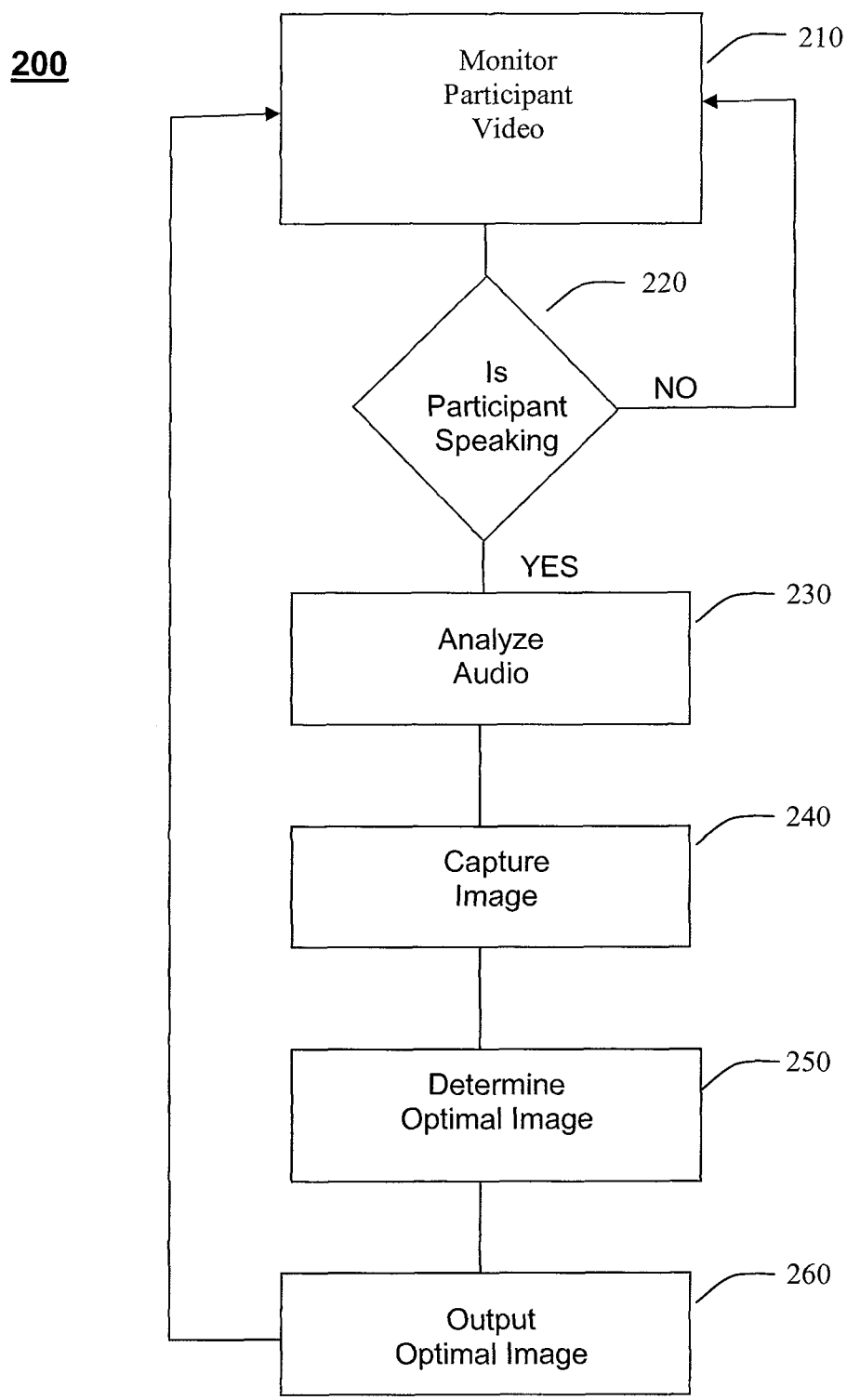
FIG. 2 shows a flow diagram of a method of providing visual resources of video conference participants.

FIG. 2 is a flow diagram of a method of providing visual resources of video conference participants. In the process 200, the system will monitor the conference at step 210. The next step 220 determines if a particular speaker is actively speaking. If a particular participant is not speaking, then the method 200 will loop back to step 210. If a particular speaker is actively speaking, the audio for that speaker is analyzed at 230. It is understood, as noted above, that the audio portion and video portion are synchronized. This audio analysis 230 comprises classifying the phonemes of the participant speaker as noted above. At step 240, an image of the active speaker is captured. The classified phonemes are utilized to capture a synchronized video image of an aesthetic image. For each audio segment that is identified as an "aesthetic phoneme", the system may analyze the time corresponding video frames, per the synchronization, and identify an optimal image frame, at step 250. The optimal image may be determined by one or more of the following parameters.

1. Was the face captured in its entirety? This may be determined by face detection and analysis algorithms.
2. Was the face image frontal? This may be determined by face detection and analysis algorithms?
3. Was the face occluded?
4. Was the face properly composed
5. Was the frame exposure in high quality? In other words, was the face in focus with sufficient exposure conditions or was the level of lighting of the scene and the face appropriate?
6. Was there too much motion in the background scene?

It is understood that the process of selecting an optimal snapshot is independent of capture of a video image as long as the video and audio are synchronized.

The process at step 250, of determining an optimal image, may be performed by a highly computational intensive algorithm. While use of audio and phonemes reduces the computational intensity of real time analysis, these highly computational intensive algorithms, which may be utilized for step 25, do not need to be run in real time.

At step 260 of FIG. 2, the system will output an aesthetically optimal image. The aesthetically optimal snapshots may be utilized for any purpose, including those described in this specification.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for presenting an aesthetic image, said method comprising:
   receiving at an audio analysis tool, a set of audio and video streams for at least one of a plurality of users in a video conference, said audio and video streams being synchronized with each other;
   analyzing said audio track of said one of a plurality of users in said video conference to determine when said user is an active speaker;
   when said user is an active speaker, analyzing a speech signal of the audio track to identify aesthetic phonemes of said active speaker, wherein the aesthetic phonemes comprise phonemes that, when spoken by said active speaker, produce aesthetically pleasing face expressions; and
   extracting an optimal image from said video stream of said active speaker corresponding to one of said aesthetic phonemes, said optimal image comprising a frame from said video stream.

2. The method of claim 1, wherein said process of analyzing the speech signal of the audio track comprises classifying phonemes of the speech signal into at least two sets of phonemes.

3. The method of claim 2, wherein one of said at least two sets of phonemes is aesthetic phonemes.

4. The method of claim 1, said method further comprising refining said determined aesthetic image utilizing audio parameters of the audio track.

5. The method of claim 4, wherein said audio parameters comprise an estimation of the audio direction.

6. The method of claim 4, wherein said audio parameters comprise a background noise estimation.

7. The method of claim 4, wherein said audio parameters comprise cross talk detection.

8. The method of claim 1, further comprising:
   replacing said video stream on the video conference with said optimal image.

9. A system for presenting an aesthetic image, said system comprising:
   an audio analysis tool enabled to receive a set of audio and video streams for at least one of a plurality of user in a video conference, said audio and video streams being synchronized with each other, analyze said audio track of said one of a plurality of users in said video conference to determine when said one of a plurality of users is an active speaker, analyze a speech signal of the audio track to identify aesthetic phonemes of said active speaker, wherein the aesthetic phonemes comprise phonemes that, when spoken by said active speaker, produce aesthetically pleasing face expressions, and extract an optimal image from said video stream of said active speaker corresponding to one of said aesthetic phonemes, said optimal image comprising a frame from said video stream.

10. The system of claim 9, wherein said analysis of the speech signal comprises classification of phonemes of the speech signal into at least two sets of phonemes.

11. The system of claim 10, wherein one of said at least two sets of phonemes is aesthetic phonemes.

12. The system of claim 9, wherein said tool is further enabled to refine said determination of the aesthetic image by utilizing audio parameters of the audio track.

13. The system of claim 12, wherein said audio parameters comprise an estimation of the audio direction.

14. The system of claim 12, wherein said audio parameters comprise a background noise estimation.

15. The system of claim 12, wherein said audio parameters comprise cross talk detection.

16. The system of claim 9, wherein the audio analysis tool is further enabled to:
   replace said video stream on the video conference with said optimal image.

* * * * *